Feb. 3, 1931.  A. E. SPINASSE  1,790,774
MEANS FOR AND PROCESS OF DRAWING SHEET GLASS
Filed Aug. 18, 1919   2 Sheets-Sheet 1
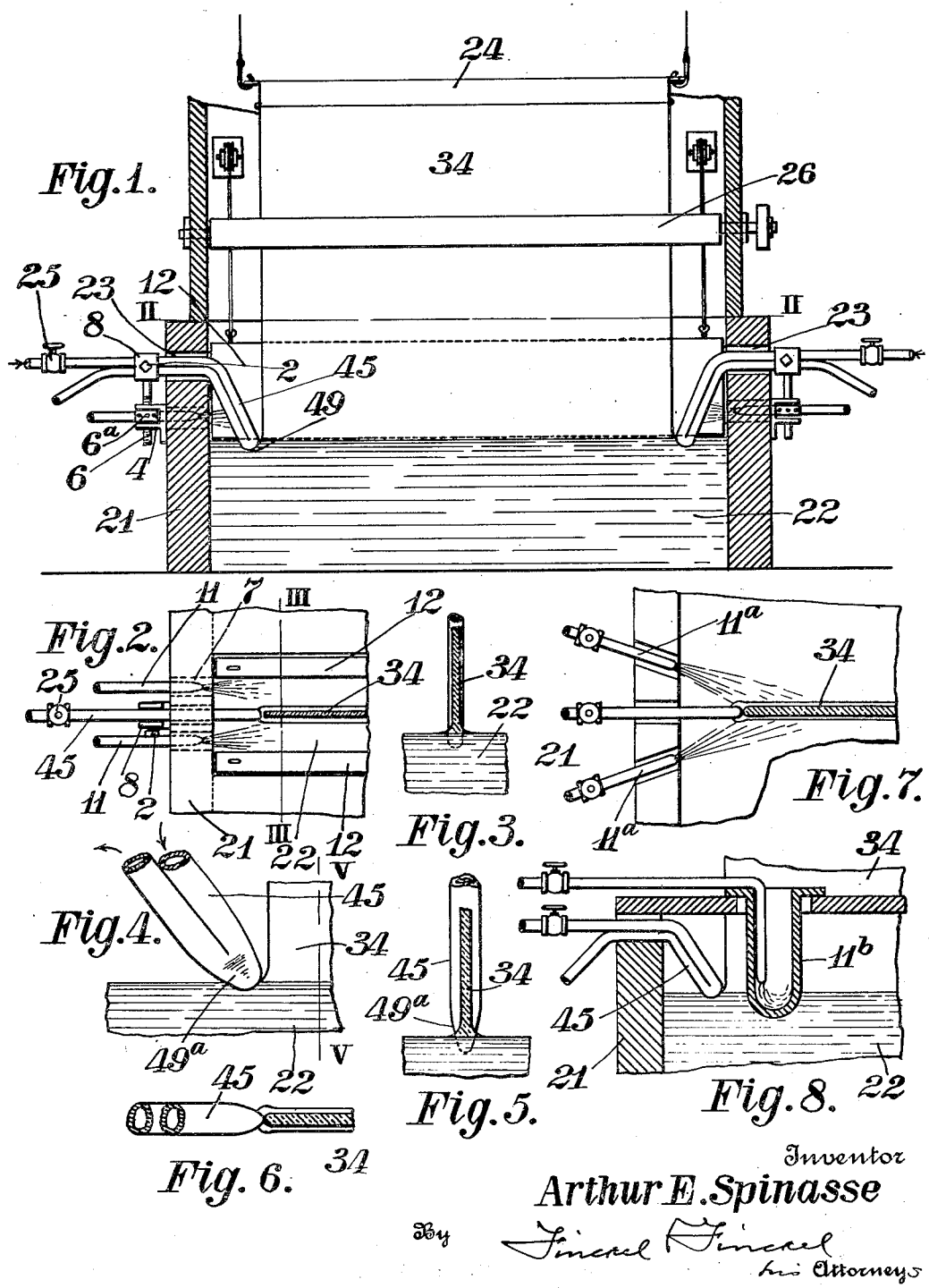
Inventor
Arthur E. Spinasse
By Fincaul Fincaul
his Attorneys

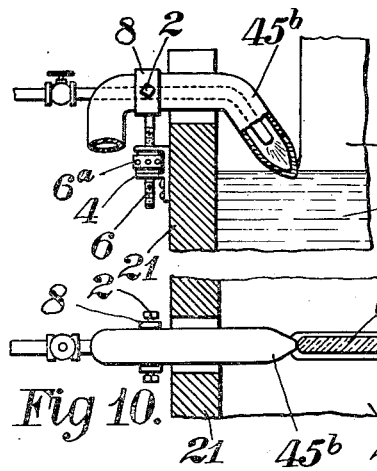
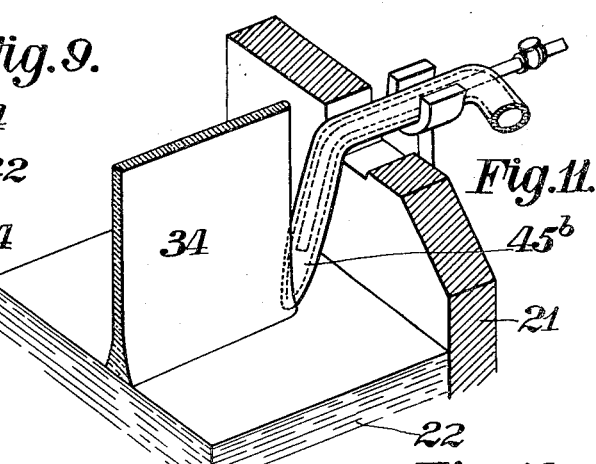
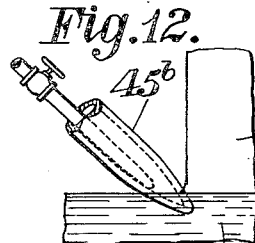
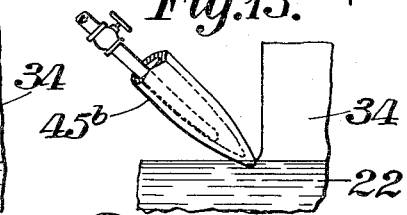
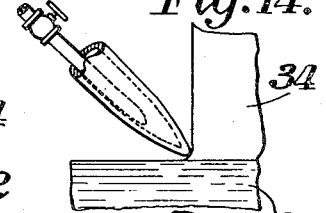
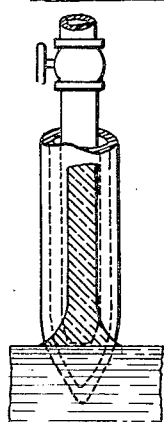
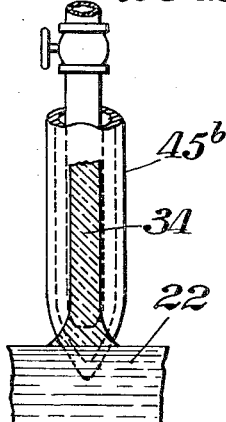
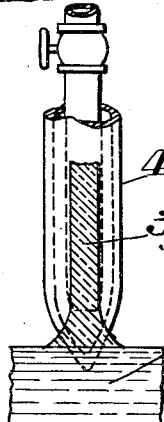
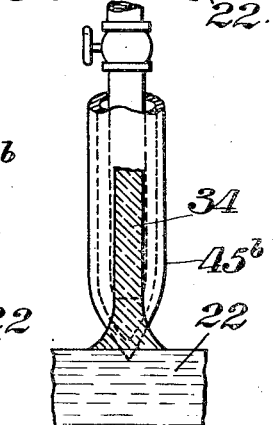
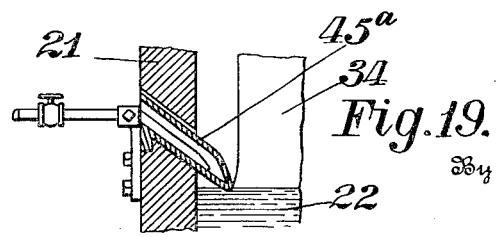

Patented Feb. 3, 1931

1,790,774

UNITED STATES PATENT OFFICE

ARTHUR E. SPINASSE, OF MOUNT VERNON, OHIO

MEANS FOR AND PROCESS OF DRAWING SHEET GLASS

Application filed August 18, 1919. Serial No. 318,111.

My invention relates to the method of and apparatus for drawing glass sheets or plates.

Heretofore the edges and margins of drawn sheet glass have been thicker than the body of the sheet rendering it necessary, if a sheet of uniform thickness for use is desired, either to provide means for compressing the edge and margins while the sheet is still hot or remove such thick edges after it is cooled. Both these methods involved more or less waste, trouble and expense.

The object of the present invention is the provision of means for and a method of obtaining in the drawing operation alone an edge and margin of no greater thickness than the body of the sheet of glass, and the invention consists in the means and method substantially as hereinafter described and pointed out in the claims.

Generally stated I accomplish these objects by using a special or narrow anchor and modifying the temperature thereof to cause and maintain the proper adhesion and at the same time preserve the operative integrity of the anchoring points.

I also control or modify the temperature and viscosity of the glass pool from which the margins of the glass sheet are drawn to obtain proper homogeneity in the glass bath from which such margins are drawn and thereby obtain the desired uniformity of thickness of the margins contiguous the edges in conjunction, of course, with the desired or necessary uniformity elsewhere in the sheet.

In carrying out my invention I prefer to make the anchoring points hollow and of small or restricted external dimensions and of substantially a breadth at the drawing place equaling the thickness of the glass sheet or plate to be drawn, and by the application of the temperature regulating medium to the anchoring members control the degree of adherence of the glass to them. In this manner also the sheet edges are prevented from receding from the drawing line of the anchoring points and form the edges of the desired thickness and finish.

To obtain the proper degree of viscosity and adherence of the glass in contact with the points it is important carefully and accurately to localize the application of the temperature controlling medium or agent with respect to such points. The proper degree or intensity of adhesion is important because if the anchor member, and the glass in contact therewith, should become too hot, even though the glass adhere, the sheet edges drawn would nevertheless recede from the drawing line resulting in a narrowing of the sheet. By the means herein described I secure uniformity in the viscosity and texture of the molten glass and of the glass along the drawing line, and thus keep the sheet edge drawn properly stretched and thereby obtain a sheet comparatively free from lines or other blemishes.

Because the sheets to be drawn are oftentimes quite thin the anchoring members are, according to my invention, comparatively slender at their operative portions and therefore, unless of suitable material and properly protected are susceptible to destruction or disintegration by the high heat to which they are subjected in the glass bath. It is therefore important that, aside from the control of adhesion of the glass to such member, that they be cooled or modified to a temperature tending to preserve their operative integrity for a satisfactory period, especially if metal is employed as the material for the anchoring point. It is preferable that the material used for the anchors have a melting point above that required to maintain the proper degree of adhesion so that incidentally the anchor may be easily kept cool enough to preserve its operative integrity but if a material whose melting point is below the temperature of the glass bath it will nevertheless be important to cool the same to a temperature below that of the bath in order to secure both the proper degree of adhesion and longevity of the anchor. It is preferable to make the anchors of metal, steel for example, because in that material they can be made of small dimensions and smooth and polished as well as of the necessary strength. Metal is also a good conductor of heat and therefore readily susceptible of being kept at a temperature sufficiently high, as by conduction and radiation of heat from the molten bath, to secure and maintain the adherence of the glass being drawn in contact therewith, as well as to be lowered slightly to the desired temperature to regulate the viscosity of the glass adhering thereto by the application of a temperature controlling medium, for shaping the forming edge portions of the sheet and counteract the narrowing tendency of the sheet.

In the accompanying drawings illustrating examples of my invention—

Figure 1 is a sectional view with parts in elevation of a glass tank showing one embodiment of my invention applied thereto.

Fig. 2 is a detail in horizontal sectional view on the line II—II Fig. 1.

Fig. 3 is a vertical section on the line III—III Fig. 2 looking toward the anchoring device and omitting the other parts of the apparatus.

Fig. 4 is a side view of another form of anchoring device.

Fig. 5 is a vertical section on the line V—V Fig. 4, looking toward the anchoring device.

Fig. 6 is a top plan view of the anchoring device as shown in Fig. 4.

Fig. 7 is a horizontal section like that shown in Fig. 2 with gas jets arranged or directed to heat the glass bath at the regions near the margins of the drawn glass.

Fig. 8 illustrates in sectional detail another means to heat the glass bath in the region near the margins of the drawn glass.

Fig. 9 is a sectional detail of another form of anchoring device.

Fig. 10 is a plan view of the same.

Fig. 11 is a perspective view of an anchoring device similar to that shown in Figs. 9 and 10.

Figs. 12, 13 and 14 are side views showing three different positions of the anchoring device, such as shown in Fig. 9, with reference to the surface of the bath.

Figs. 15, 16, 17 and 18 are vertical sections through the margins of the glass sheet near the anchoring device illustrating how variations in the penetration and temperature of the anchoring device such as shown in Figs. 9–14 may be utilized to produce substantially the same thickness of margin or sheet.

Fig. 19 shows in vertical section a form in which the anchoring point can be made of fire clay.

Referring first to the form shown in Figs. 1 and 2 the character 21 designates the drawing tank or chamber which may be connected to a melting furnace as usual and is supplied with molten glass 22 from said tank. The tank has a suitable roof. 24 is the usual bait, 26 the draft rolls and 12 are shields for confining and controlling the heat in the drawing area.

Openings 23 are provided at opposite points in the walls of the tank through which are passed the anchoring devices consisting in this instance of return bent pipes 45, their bent ends being slightly immersed in the glass bath so as to provide the anchoring points 49, and upon which adhere the portions of glass from which the sheet edges are drawn. 34 designates a sheet drawn with its edges formed from the glass at such points. The pipes 45 may be made of any sufficiently resistant material, preferably of seamless metal tubing, the same being shown as supported in a fork or collar 8 in which the pipes may be advanced or retracted and fixed by set screws 2 to determine or control the width of the sheet glass to be drawn. The forks or collars 8 have threaded stems 6 that pass through a bracket 4 fixed on the tank, and said stem 6 having a nut $6^a$ thereon so that the anchoring points may also be raised or lowered and fixed by said nut to determine or control the degree of immersion with respect to the surface of the glass bath 22. Before fixing the anchoring device in position in the furnace and applying the heat controlling medium I heat their operative ends by immersion in the bath to cause the glass to adhere to them. They may be otherwise heated.

In practice I control or regulate the temperature of the anchoring points after adhesion is obtained to modify the viscidity and degree of adhesion of the glass portion in contact with or adjacent to said anchoring points by passing a fluid from any suitable source through the pipes 45, as indicated by an arrow, said fluid being of a quantity and temperature necessary to modify to the desired or proper degree the temperature of the anchoring point. To secure proper modification of the temperature of the anchoring point the temperature of the modifying agent should be lower than that of the glass bath. For this purpose water or air may be used. Valves 25 are shown as a means for controlling the fluid passing through the pipes 45, said valve being adapted to be manipulated to regulate the passages of said pipes and therefore the quantity of water or air to be admitted. For ordinary glass the pipes constituting the anchoring devices are preferably of small diameter and are placed in the glass with the plane of the doubling in alinement with the edges of the sheet drawn as shown in Figs. 1 and 2. The pipes 45 may be flattened as shown at $49^a$ and of larger dimension depthwise at the operative points as shown in Figs. 4 and 6, it being desirable to reduce their breadth by compression or otherwise to accord substantially with the thickness of the sheet edges to be drawn as shown in Fig. 5.

When adhesion to the pipes or anchor has taken place their temperature may be varied at will to maintain the adhesion during the operation. The temperature may be lowered so that a film of glass will remain substantially fixed thereon, the sheet edges being drawn from the adherent film. It is preferable to allow the temperature of the anchoring points to rise as far as possible toward the melting point but without melting and below the point at which the sheet edges have a tendency to recede from the drawing line at the anchors therein. In this manner the edges are drawn from the glass which lies closely to the anchoring points somewhat with a sort of drag under tension due to stretching thereby producing edges of reduced thickness.

The desired or critical temperature is determined by observing the effect of varying the temperature in the glass, the desideratum being to prevent the recession of the sheet from a vertical line passing approximately through the anchoring device at its operative portion.

Instead of using metallic pipes, as shown in Figs. 1 to 4 inclusive, an anchoring member 45$^a$ of any suitable refractory material can be employed, as for example, fire clay (see Fig. 19).

In Figs. 9 to 14 inclusive the anchoring member 45$^b$ has its ends substantially conical where it touches or dips into the bath so that its operative portion may be substantially equal to the thickness of the edge of the sheet to be drawn. In this form also a jet of temperature modifying fluid can be introduced, a suitable pipe as shown provided with a controlling valve, being provided for this purpose.

The glass drawn from the bath at the anchoring points is replaced from the mass beneath by hydrostatic pressure and perhaps by surface tension or capillary action, but in my invention the proper degree of adhesion is continuously maintained notwithstanding the movements of the adjacent glass.

The thickness of the edge drawn can be varied by varying the temperature as well by varying the depth of immersion or the position of the point with reference to the surface of the bath as shown in Fig. 14 where there is no actual immersion. For example, by raising the temperature of the anchor the edge can be made thinner but in such case due care must be observed not to raise the temperature so high as to permit a recession of the drawing line. As a corollary the same thickness of edge can be obtained by the joint use of varition in temperature and immersion as illustrated in Figs. 15 to 18 inclusive.

To localize the temperature effect at the drawing points and to counteract any undue effect by radiation burners 11 are located in openings 7 on each side of the anchors.

In Fig. 2 such burners 11 are shown as being directed parallel to each other.

To insure uniformity of thickness of the sheet drawn at the margins gas pipes 11$^a$, as shown in Fig. 7, for locally directing a gas flame against the surface of the glass bath in the region of the margins can be employed. Instead of using such means as shown in Fig. 7 a refractory clay pot or hollow member, such as shown at 11$^b$, Fig. 8, may be adjustably supported in the roof with its lower end submerged in the glass bath at opposite sides of the margins, said hollow member being heated at its interior by means of a glass flame regulated, if desired, from a pipe inserted thereinto.

The temperature in the drawing chamber is regulated by any suitable means, as for example adjustable shields 12 arranged at the opposite sides of the sheet for protecting the sheet from excessive heat of the furnace.

It will be noted from the drawings and from the foregoing description that the operative portion of the anchor is of a diameter in a horizontal direction at right angles to the sheet drawn not substantially greater than the thickness of the sheet at the surface of the bath and that under some conditions the anchor may be of considerably smaller diameter at its operative portion than the thickness at that point. Where the anchor is of tapering form variation in the diameter of the operative portion is quickly effected. In any form of the anchors shown the thickness of the edges of the sheet drawn can be increased by lowering the temperature and modifying the speed of drawing.

In brief it may be stated that among the advantages in restricting the operative dimensions of the anchoring point is that the glass being drawn has little or no surface upon which to spread, and the advantage in controlling the temperature of such an anchor, and therefore the degree of adhesion of the glass thereto, is that, within limits, the desired thickness of edge consistent with the maintenance of the proper width of sheet, can be obtained. Further the operative integrity of the anchor is preserved.

The application for this patent is, in part, a division of an application filed by me January 10, 1918, Ser. No. 211,266, now Patent No. 1,692,585.

What I claim is:

1. An anchoring device for use in drawing sheet glass, consisting of a hollow body having a conical point and a pipe extending into said hollow body and adapted to convey to the point a temperature regulating medium.

2. An anchoring device for use in drawing flat sheet glass consisting of a body decreasing in horizontal diameter transversely as respects the plane of the sheet to a diameter less than the maximum thickness of the glass being drawn at the point of generation of the edge of the sheet and means independent of the molten glass for conveying a temperature regulating medium thereto and means whereby the device is held in fixed anchoring position.

3. An anchoring device for use in drawing flat sheet glass consisting of a body decreasing in horizontal diameter transversely as respects the plane of the sheet to a diameter less than that of the maximum thickness of the glass being drawn at the point of generation of the edge of the sheet, means for varying and fixing its anchoring position in respect of the molten glass and means independent of the molten glass for controlling its temperature to modify and regulate the adhesion of the glass thereto whereby the thickness of the edge of the drawn sheet can be controlled.

4. In apparatus for drawing sheet glass from an open bath of molten glass at a particular level, a pair of hot metallic anchoring members adapted to adhere to hot glass and disposed one at each edge portion of the forming sheet being drawn, and adjustable means for maintaining said hot adherent metallic members normally fixed in position so that the forming edge portions of the sheet will contact and adherently drag against the surfaces of said hot metallic anchoring members.

5. In apparatus for drawing sheet glass, a pair of anchoring devices between which the sheet is to be drawn, said anchors each consisting of a body decreasing in horizontal diameter to a diameter less than that of the maximum thickness of the glass being drawn at the point of generation of the edge of the sheet, means for varying and fixing its anchoring position as respects the molten glass and means independent of the molten glass for controlling its temperature to modify and regulate adhesion of the glass thereto whereby the thickness of the respective edges of the drawn sheet can be controlled.

6. A hollow stationary anchoring member for the edge of a sheet of drawn glass having its effective glass anchoring edge forming portion of smaller diameter horizontally in a direction transverse the plane of the drawn sheet than the thickness of such sheet at its source, means for varying and regulating its anchoring penetration into the glass, and means for circulating to the interior thereof a temperature regulating medium.

7. A hollow anchoring member for the edge of a sheet of drawn glass having its effective glass anchoring edge forming portion of smaller diameter than the thickness of the drawn glass at its source, means for maintaining said anchor at fixed anchoring penetration into the glass and means for circulating to the interior thereof a temperature regulating medium.

8. The process of drawing a sheet of glass from a bath of molten glass between a pair of fixed anchors consisting in lowering the temperature of the anchoring surface of the anchors below that of the surrounding glass but maintaining its temperature sufficiently high to cause the glass to adhere to them, modifying and controlling the degree of anchoring width of the anchors and drawing the glass to form the sheet from between said anchors.

9. The process of drawing a flat sheet of glass from a bath of molten glass between a pair of fixed anchors consisting in heating said anchors to secure adhesion of the glass thereto, said anchors being placed in penetrating contact with the glass, subsequently modifying and regulating the temperature of the anchors to maintain anchoring adhesion of the glass thereto and modifying and regulating the width of the glass drawing anchoring penetrations of the anchors in the glass and drawing the glass to form the sheet from between said anchors.

10. In sheet glass drawing apparatus, a receptacle for containing a bath of molten glass from which to draw the sheet, and normally fixed hot adherent metallic means adapted for direct contact with the drawn edge portion of the sheet, and means other than the bath for modifying and regulating the temperature of said first means.

11. In apparatus for drawing sheet glass from a bath of molten glass, means for maintaining the width of a sheet being drawn comprising a normally fixed hot hollow metallic member adapted to directly contact and adhere with the drawn edge portion of the meniscus of the sheet, and means for circulating air within said member to maintain and increase the degree of adherence of the glass dragging in adherent contact against said hot hollow metallic member.

12. In apparatus for drawing sheet glass from an open bath of molten glass at a particular level, a hot hollow metallic edging device within which air may circulate, means for maintaining said hot hollow metallic device normally fixed in position so that the forming edge portion of the sheet glass being drawn will adherently contact with the surface thereof to counteract the narrowing tendency of the sheet.

13. In apparatus for drawing sheet glass, a receptacle for containing an open bath of molten glass at a particular level, means for counteracting the narrowing tendency of the sheet comprising hot metallic edging members adapted to adhere to hot glass, means for fixedly holding said members in position adjacent the source of the forming edge portions of the sheet glass being drawn, and means for drawing the sheet from the open bath of molten glass with the edge portions of the sheet taking form from the portions of the glass lying adjacent and adhering to said fixed hot metallic edging members.

14. In apparatus for drawing sheet glass from an open bath of molten glass, a hot hollow metallic edging device within which air may circulate, said device being adapted to adhere to hot glass and gradually decreasing in diameter towards its lower portion, and means for maintaining said device fixed in desired position so that the forming edge of the sheet being drawn will contact and adhere to said edging device.

15. The process of drawing sheet glass with the use of a metallic edging member, the steps which consist in drawing the sheet from a bath of molten glass, maintaining said metallic member at a temperature sufficiently high to cause hot glass to adhere therewith, maintaining said metallic member at such temperature and in position adjacent the forming edge portion of the sheet glass being drawn, and adherently dragging the forming edge portion of the sheet against said hot metallic edging member to shape the edge and counteract the narrowing tendency of the sheet.

16. The process of drawing sheet glass with the use of hollow metallic edging members, the steps which consist in drawing the sheet from the free surface of an open bath of molten glass, maintaining said hollow metallic members at a temperature sufficiently high to cause hot soft glass coming in contact therewith to adhere thereto, maintaining said hollow metallic members at such temperature and fixed in position adjacent the forming edge portions of the sheet, and adherently dragging the forming edge portion of the sheet against the walls of said hollow metallic members while admitting air within said hollow metallic members.

17. In apparatus for drawing sheet glass, a receptacle for containing an open bath of molten glass, means for drawing a glass sheet from the surface of the bath, and a normally fixed edging member adjustable in horizontal and vertical position and adapted to contact with the drawn edge of the meniscus of the sheet above the surface level of the bath, and means other than the bath for modifying the temperature of said edging member.

18. In sheet glass drawing apparatus, a receptacle having walls for holding an open bath of molten glass, means for drawing the sheet from the open bath with the edges thereof taking form adjacent the walls of said receptacle, hot hollow metallic edging members, means outside the receptacle for holding said members fixed in adherent contact with the forming drawn edge portions of the sheet adjacent to said walls, and means for circulating air within said members to regulate the adhesion of the drawn glass dragging against the same to shape the drawn edges and counteract the narrowing tendency of the sheet.

19. In sheet glass drawing apparatus, a receptacle having walls for holding a bath of molten glass from which to draw the sheet, metallic anchoring members fixed adjacent the walls of said receptacle for engaging the drawn edge portions of the sheet, and means for heating the glass at the sides of said metallic anchoring members.

20. In sheet glass drawing apparatus, a receptacle having walls for holding a bath of molten glass, means for drawing the sheet from the bath with the edge portions of the sheet taking form adjacent to said walls, a pair of normally stationary hot hollow metallic anchoring fingers for adherent contact with the forming edge portions of the sheet, means for modifying and controlling the temperature of the fingers, and means outside the receptacle for adjustably supporting said fingers.

ARTHUR E. SPINASSE.